United States Patent
Vandermeulen et al.

(10) Patent No.: US 8,372,216 B2
(45) Date of Patent: Feb. 12, 2013

(54) CONTINUOUS METHOD FOR TREATING THE SURFACE OF METAL STRIPS

(75) Inventors: Guido Vandermeulen, Ilvesheim (DE); Bernd Strubel, Mannheim (DE); Helmut Witteler, Wachenheim (DE); Jessica Neumann, Ludwigshafen (DE); Walter Bertkau, Ludwigshafen (DE); Bernd Laubusch, Bürstadt (DE); Jens Haas, Ludwigshafen (DE); Mirjam Herrlich-Loos, Mannheim (DE); Helmut Löw, Groβ-Zimmern (DE); Walter Braumandl, Thurmansbang (DE)

(73) Assignee: BASF SE, Ludwigshafen (DE)

( * ) Notice: Subject to any disclaimer, the term of this patent is extended or adjusted under 35 U.S.C. 154(b) by 317 days.

(21) Appl. No.: 12/935,182

(22) PCT Filed: Oct. 9, 2009

(86) PCT No.: PCT/EP2009/063140
§ 371 (c)(1),
(2), (4) Date: Sep. 28, 2010

(87) PCT Pub. No.: WO2010/046243
PCT Pub. Date: Apr. 29, 2010

(65) Prior Publication Data
US 2011/0017352 A1  Jan. 27, 2011

(30) Foreign Application Priority Data

Oct. 20, 2008  (EP) .................................. 08167029

(51) Int. Cl.
*C23C 22/17*  (2006.01)

(52) U.S. Cl. ................. 148/257; 106/14.12; 106/14.44; 148/253; 148/259

(58) Field of Classification Search ............... 106/14.12, 106/14.44; 148/253, 257, 259
See application file for complete search history.

(56) References Cited

U.S. PATENT DOCUMENTS

| | | | |
|---|---|---|---|
| 3,364,081 | A | 1/1968 | Forsberg |
| 7,655,279 | B2 | 2/2010 | Dietsche et al. |
| 7,749,337 | B2 | 7/2010 | Witteler et al. |
| 2006/0162820 | A1 | 7/2006 | Dietsche et al. |
| 2007/0082193 | A1 | 4/2007 | Dietsche et al. |
| 2007/0176149 | A1 | 8/2007 | Dietsche et al. |
| 2008/0197020 | A1 | 8/2008 | Witteler et al. |

(Continued)

FOREIGN PATENT DOCUMENTS

| | | |
|---|---|---|
| DE | 19941600 A1 | 3/2001 |
| DE | 19941734 A1 | 3/2001 |

(Continued)

OTHER PUBLICATIONS

U.S. Appl. No. 12/665,554, filed Dec. 18, 2009, Vandermeulen.

(Continued)

*Primary Examiner* — Lois Zheng
(74) *Attorney, Agent, or Firm* — Novak Druce Connolly Bove + Quigg LLP (57) ABSTRACT

A continuous method for surface treatment of metal strips applies a finish coat having a thickness of not more than 3 μm, the apparatus employed for application being equipped with at least one IR sensor which faces a coated side of the strip, operates in reflection geometry, and serves to measure the coat thickness of the finish coat, with the strip running.

20 Claims, 7 Drawing Sheets

U.S. PATENT DOCUMENTS

| | | |
|---|---|---|
| 2008/0199714 A1 | 8/2008 | Witteler et al. |
| 2008/0269446 A1 | 10/2008 | Michl et al. |
| 2009/0007990 A1 | 1/2009 | Klippel et al. |
| 2010/0175792 A1 | 7/2010 | Dietsche et al. |

FOREIGN PATENT DOCUMENTS

| | | |
|---|---|---|
| EP | 488726 A2 | 6/1992 |
| WO | WO-2004/074372 A1 | 9/2004 |
| WO | WO-2004/081128 A2 | 9/2004 |
| WO | WO-2005/042801 A1 | 5/2005 |
| WO | WO-2006/021308 A1 | 3/2006 |
| WO | WO-2006/021309 A1 | 3/2006 |
| WO | WO-2006/134116 A1 | 12/2006 |
| WO | WO-2006/134117 A1 | 12/2006 |
| WO | WO-2006/134118 A1 | 12/2006 |
| WO | WO 2009/112452 A2 | 9/2009 |

OTHER PUBLICATIONS

U.S. Appl. No. 12/681,568, filed Apr. 2, 2010, Bertkau.

CONTINUOUS METHOD FOR TREATING THE SURFACE OF METAL STRIPS

CROSS-REFERENCE TO RELATED APPLICATIONS

This application is a national stage application (under 35 U.S.C. §371) of PCT/EP2009/063140, filed Oct. 9, 2009, which claims benefit of European application 08167029.1, filed Oct. 20, 2008.

BACKGROUND OF THE INVENTION

The present invention relates to a continuous method for surface treatment of metal strips, in which a finish coat having a coat thickness of less than 3 μm is applied to the metal strip, the apparatus employed for application being equipped with at least one IR sensor which faces a coated side of the strip, operates in reflection geometry, and serves to measure the coat thickness of the finish coat while the strip is moving.

The steel strips are generally protected from corrosion by means of appropriate measures. This generally involves multistage operations. In a first step the steel strips are coated typically with zinc or zinc alloys. The action of the zinc derives first from the fact that it is baser than steel and thus initially undergoes corrosion itself. The steel surface remains intact as long as it is still covered continuously with zinc. Moreover, in the presence of atmospheric oxygen, a thin oxide layer forms on the surface of Zn or its alloys and slows down corrosive attack on the underlying metal to a greater or lesser extent in accordance with the external conditions.

The protective effect of an oxide layer of this kind is generally boosted by subjecting the Zn surfaces to an additional passivating treatment. In the course of such a treatment, some of the metal to be protected dissolves and is incorporated at least partly into a film on the metal surface. Instead of the term "passivation coat" the terms "conversion coat", "aftertreatment coat" or "pretreatment coat" are also used, synonymously.

The implementation of a passivation of this kind through treatment of the galvanized steel surface with acidic Cr(VI) and/or Cr(III) solutions is known. Increasingly, however, use is also being made for this purpose of chromium-free formulations, examples being phosphate formulations or else formulations which comprise different polymers.

One important class of polymers which are used in formulations for passivating is that of acidic, water-soluble polymers, such as, for example, polyacrylic acid or copolymers of acrylic acid with other monomers, more particularly with other acidic monomers such as vinylphosphonic acid, maleic acid or itaconic acid. The use of polymers of this kind for passivation is disclosed in, for example, WO 2004/074372, WO 2005/042801, WO 2006/021308, 2006/021309, WO 2006/134116, WO 2006/134117 or WO 2006/134118. Also known, however, is the use of polymers with N-containing groups, such as, for example, polymers which comprise vinylimidazole as disclosed by WO 2004/81128, for example.

Passivation coats as a general rule are very thin. The dry coat thickness of passivation coats is generally not more than 3 μm; in modern-day passivating processes, the aim is for a dry coat thickness below 1 μm, such as 0.01 to 0.4 μm, for example. For quality control and for control of the process it is necessary to determine the coat thickness.

This control is generally practiced discontinuously: in other words, in ongoing operation, a sample is cut from the moving metal strip and is subjected in the laboratory to wet-chemical or spectroscopic analysis. This process is unsatisfactory, being time-consuming and failing to allow a sufficiently rapid response to changes in strip quality.

Also known, furthermore, is the use of X-ray fluorescence analysis for monitoring the surface treatment. This does allow monitoring, but the X-ray fluorescence analysis can be used only to determine certain conductive elements, and even for such elements is unable to determine deviation in the chemical composition if the concentration of a conductive element is otherwise the same. For instance, X-ray fluorescence processes are unable, for example, to distinguish between the occupation of the surface with chromate compounds and its occupation with chromium(III) salts. Moreover, X-ray fluorescence processes cannot be used to determine thin coats with organic coating materials such as oils and polymers, for example, since the processes do not respond to these materials. Other conventional coat thickness measurement processes do not have a sufficiently high sensitivity to provide a quantitative description of coat thicknesses smaller than 1000 nm.

The use of IR spectroscopy processes in the course of the production of metal sheets and metal strips is known.

EP 488 726 A2 discloses a process for silicon steel sheets that defines the surface quality of the silicon steel via the intensity of infrared absorption bands. That process, however, is not continuous.

DE 199 41 734 B4 discloses a continuous method of process control in the pickling of steel strip. Pickling is a term used by the skilled worker to describe the removal of oxides and other contaminants from metallic surfaces. Through analysis of the intensity of reflected IR radiation, the degree of scaling of the metal surface is determined, and the pickling operation is controlled as a function of the measurement values.

DE 199 41 600 C2 discloses a method of process control and process optimization during the hot rolling of steel, in which the electromagnetic radiation emitted by the hot metal, in the form of a spectrum, is subjected to online capture and evaluation, and where there is evaluation of crystallographic transformations of the metal that take place at defined temperatures.

Our earlier application EP 08152645.1 discloses a method of continuous monitoring of the surface of metal strips bearing thin finish coats by means of a Fourier transform IR spectrometer. Using a Fourier transform IR spectrometer it is possible to measure the entire IR spectrum with the finish coat, but the spectrometer has moving parts, and so must not be exposed to any vibrations in operation.

BRIEF SUMMARY OF THE INVENTION

It was an object of the present invention to provide an improved continuous method for the surface finishing of metal strips, more particularly for the passivation of metal strips, in which there is continuous quality control while the metal strip is moving, which is insensitive in respect of shaking and vibrations in operation.

Found accordingly has been a method for continuous surface treatment of a metal strip with a liquid formulation (F), in which a metal strip is moved longitudinally through an apparatus for surface treatment of metal strips that comprises at least one device (3) for applying the formulation (F) and in which the formulation (F) is applied to the metal strip by means of the device (3), the amount of formulation to be applied being calculated so as to form a nonmetallic finish coat having a coat thickness of less than 3 μm on the metal surface, which method comprises equipping the apparatus employed, downstream of the device (3)—as viewed in the running direction of the strip—with at least one IR sensor (6) which faces a coated side of the strip, operates in reflection geometry, and comprises     at least one broadband-emitting IR source (9), and also     at least one IR multichannel detector (10) comprising at least two measurement channels, each of the measurement channels being equipped with an IR filter (11) which is mounted upstream of the measurement channel in question, and each of which is transmissive only for a particular wavelength range of the IR radiation with the proviso that at least two different IR filters are used,     and in which the IR source (9) emits IR radiation toward the coated strip surface, the radiation is partly reflected from the strip surface, and the intensity of the reflected radiation is measured with the IR multichannel detector (10), and from the intensity measurement, by means of an arithmetic unit, the coat thickness of the finish coat is calculated.

Found in a further embodiment of the invention has been a method for continuous surface treatment of a metal strip with a liquid formulation (F), in which a metal strip is moved longitudinally through an apparatus for surface treatment of metal strips that comprises at least     a device (3) for applying the formulation (F) and     a drying station (5), in which the formulation (F) comprises at least one solvent and also coating-forming components, the formulation (F) is applied to the metal strip by means of the device (3), the solvents are at least partly removed by means of the drying station, the amount of formulation to be applied being calculated so as to form a nonmetallic finish coat having a dry coat thickness of less than 3 μm on the metal surface, which method further involves equipping the apparatus employed, downstream of the drying station (5)—as viewed in the running direction of the strip—with at least one IR sensor (6) which faces a coated side of the strip, operates in reflection geometry, and comprises     at least one broadband-emitting IR source (9), and also     at least one IR multichannel detector (10) comprising at least two measurement channels, each of the measurement channels being equipped with an IR filter (11) which is mounted upstream of the measurement channel in question, and each of which is transmissive only for a particular wavelength range of the IR radiation with the proviso that at least two different IR filters are used, and in which the IR source (9) emits IR radiation toward the coated strip surface, the radiation is partly reflected from the strip surface, and the intensity of the reflected radiation is measured with the IR multichannel detector (10), and from the intensity measurement, by means of an arithmetic unit, the coat thickness of the finish coat is calculated.

In one preferred embodiment of the invention the surface treatment is a passivation. With particular preference it is an acidic passivation, in which at least one polymer comprising acidic groups is employed.

DETAILED DESCRIPTION OF THE INVENTION

Details of the invention now follow:

In the method of the invention for continuous surface treatment of metal strips, the surface of a metal strip is applied with a liquid formulation (F), which comprises at least one solvent and also coating-forming components. In the course of this application a nonmetallic finish coat is obtained on the metal surface with a dry coat thickness of less than 3 μm.

The term "finish coat" is intended to encompass all kinds of thin, nonmetallic coats of the stated thickness with which the surface of metal strips may be provided, by treatment with appropriate formulations, in order to change their properties, more particularly with respect to downstream processing steps, such as the application of paint coats or the forming of the strips or of pieces of them, for example. The term "nonmetallic" is of course not intended to rule out the possible presence in a finish coat of metal ions or metal compounds, such as metal oxides; rather, all that is intended is a restriction on coating of the strip with metals or metal alloys themselves, for example, the step of galvanizing the strip. Finish coats preferably comprise at least one organic component. A characteristic of finish coats is that they are applied directly to the metal surface.

Examples of nonmetallic finish coats include temporary or permanent corrosion control coats, more particularly passivation coats, tie coats, oil coats or wax coats which may be applied, for example, for the purpose of improving the formability; phosphating treatments, chromating treatments, conversion coats or else reactive coatings in which cations are dissolved from the metal and become part of the coat. Preference is given to finish coats which comprise organic components.

The method of the invention is preferably a passivation, and the finish coat, accordingly, is a passivation coat.

The metal strips used for the method may in principle be any kinds of metal strips. Depending on the envisaged end use, the metal strips used may have a thickness of 0.05 mm to 5 mm, preferably 0.3 to 3 mm, a width of 0.5 to 2.5 m and a length of several hundred meters. Preferably they are strips of steel, iron, zinc, tin, aluminum, copper or alloys thereof, it also being possible for the strips to have a metallic coating as well, such as of tin, zinc, aluminum, nickel, preferably zinc, aluminum or alloys thereof.

In one preferred embodiment of the invention the metal strip employed is a steel strip, more preferably a galvanized steel strip. The steel strips in question may be hot dip galvanized or electrolytically galvanized steel strips. Galvanized steel strips are available commercially for a very wide variety of applications. The skilled worker will select an appropriate steel strip in accordance with the desired end use.

The term "galvanized" also of course encompasses coatings with Zn alloys. Zn alloys for coating of steel are known to the skilled worker. Depending on the desired end application, the skilled worker selects the nature and amount of alloying constituents. Typical constituents of zinc alloys comprise in particular Al, Mg, Pb, Si, Mg, Sn, Cu or Cd, preferably Al or Mg. The alloys may also be Al—Zn alloys in which Al and Zn are present in approximately equal amounts. The coatings may be largely homogeneous coatings or else coatings which exhibit concentration gradients. With further preference the materials in question may be Zn—Mg alloys. This may involve steel—hot dip galvanized steel, for example—that is coated with a Zn—Mg alloy, or may involve galvanized steel which has been given an additional vapor coating with Mg. By this means it is possible for a Zn/Mg alloy to be formed on the surface.

The strips may be galvanized on one side or both sides. In the case of strips galvanized on both sides it is possible to treat both sides or else only one side by means of the method of the invention.

Figure 1:
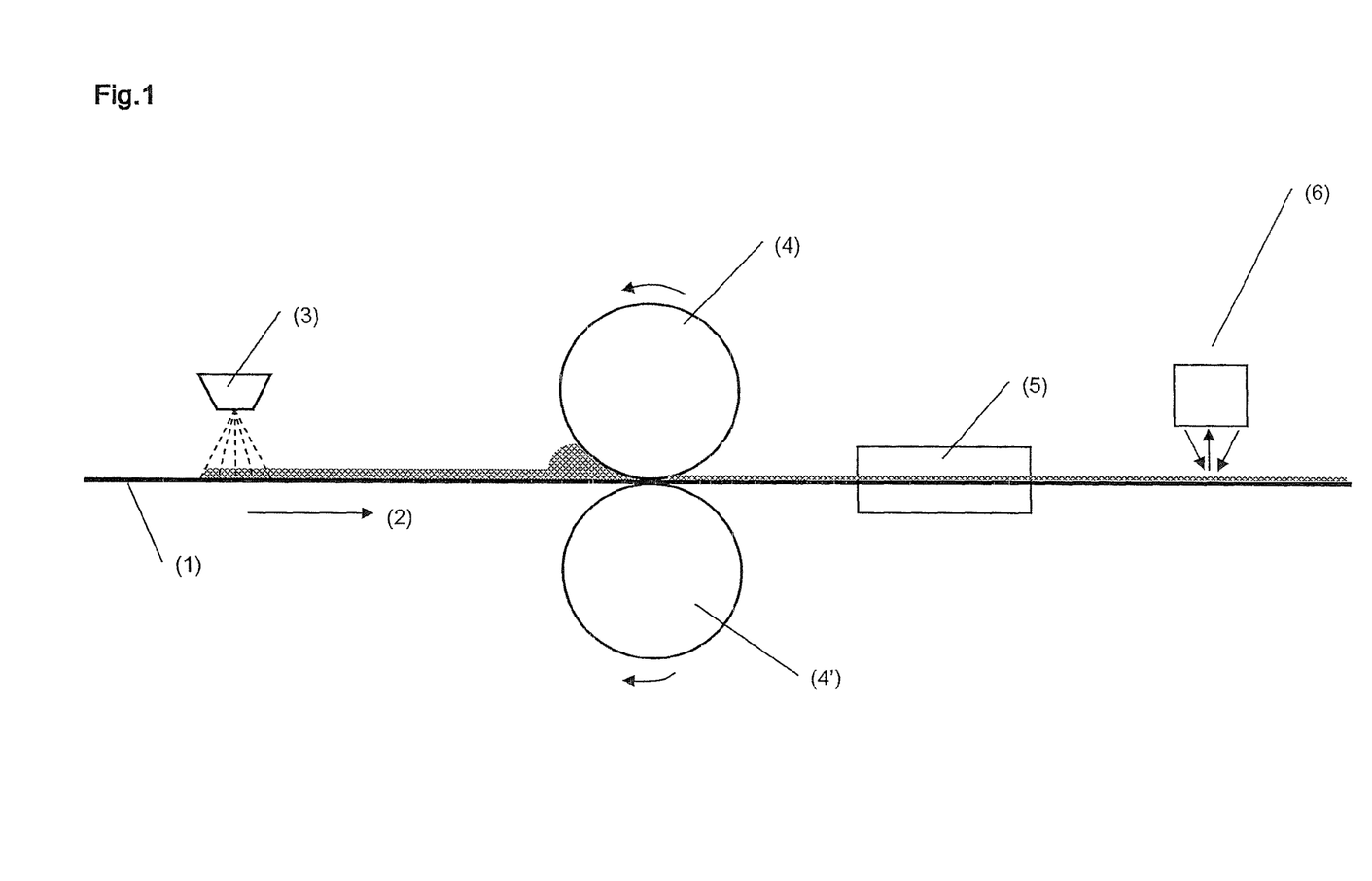
FIG. 1: Schematic representation of key elements of the method of the invention, single-sided application
Figure 2:
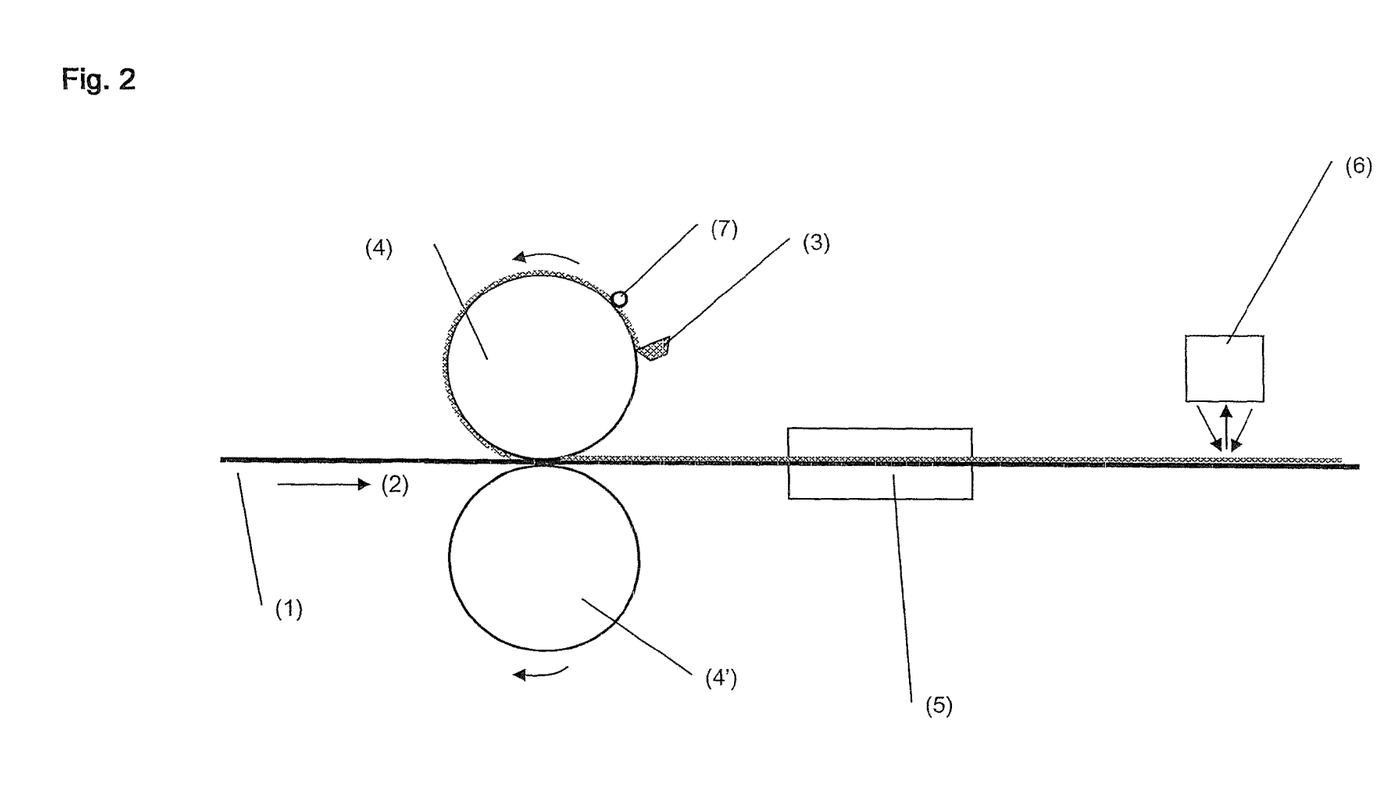
FIG. 2: Schematic representation of key elements of the method of the invention, single-sided application, different mode of application
Figure 3:
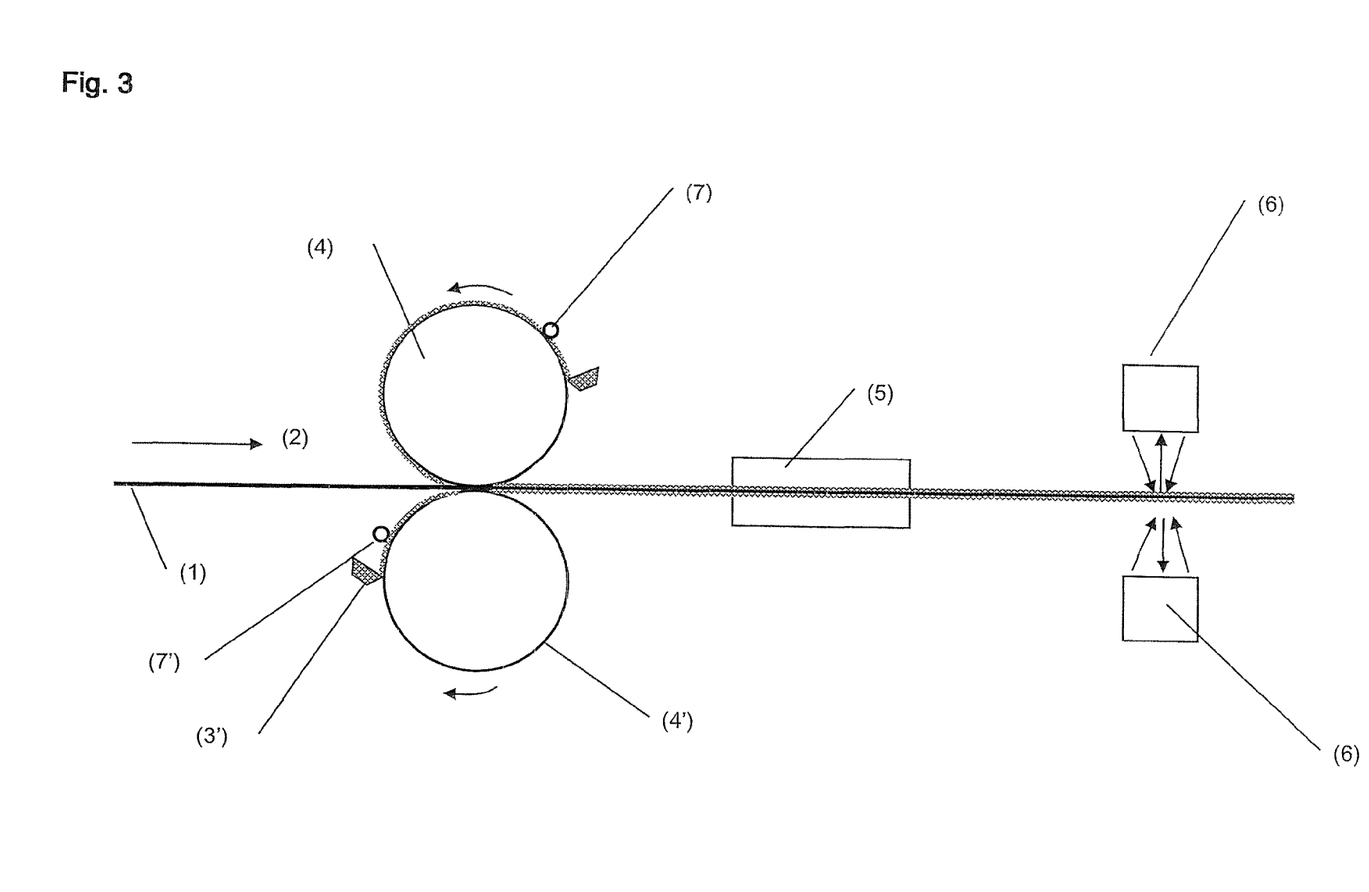
FIG. 3: Schematic representation of key elements of the method of the invention, double-sided application

The method of the invention is performed using a strip coating line. FIGS. 1 to 3 show, schematically, various embodiments of the key components of the strip coating line. Not depicted are the devices for unwinding the raw steel strip from the coil, the device for rewinding the coated strip, and the drive device for the strip. The strip coating line may additionally, of course, comprise optionally further, typical components such as a dressing station or cleaning stations, for example. Furthermore, the strip coating line may, for example, be part of an entire manufacturing line on which first of all a metal strip is galvanized, then provided by the method of the invention with a finish coat, and subsequently, if desired, painted. The metal strips may be run through the line at a speed, for example, of 20 to 300 m/s, preferably 50 to 150 m/s.

To perform the method of the invention, a formulation (F) is applied to the metal strip (1), which is moving in running direction (2), by means of a device (3). The formulation may be sprayed on to the strip by means, for example, of a spraying device (item (3) in FIG. 1). It may of course also be applied to an applicator roll or to a combination of two or more rolls which in turn transfer the formulation to the strip. Application to an applicator roll may take place by means of spraying, dipping or pouring, for example.

As a general rule, the line further comprises a device for separating off excess formulation and/or for smoothing the coating on the metal strip.

This device may be, for example, a doctor blade device, such as a doctor knife. In one preferred embodiment it comprises two rolls (4) and (4') disposed opposite one another. A gap is left between the two rolls (4) and (4'), this gap being adjustable in its width. For this purpose it is also possible for one or both rolls to be provided with a corresponding mechanism for the adjustment of the roll position. To perform the method the metal strip is moved longitudinally through the adjustable gap between the rolls (4), (4'). In this case the rolls rotate in the running direction (2) of the steel strip.

Application of the formulation (F) to the metal strip may also take place indirectly, with the formulation being applied by means of an applicator device (3) first to one of the rolls (4) or to both rolls (4) and (4') and being transferred from the rolls to the metal strip. Optionally it is possible for excess formulation to be removed from the rolls (4) and (4') by means of suitable doctor blade devices (7) and (7'), respectively. This embodiment is shown by way of example in FIGS. 2 and 3. Also possible, of course, are different embodiments of the applicator device (3), examples being those which possess a combination of two or more rollers.

In addition, the line may—depending on the nature of the formulation to be applied—comprise a drying device, with which any solvent present in the formulation (F) may be removed entirely or partly. A drying device (5) is disposed downstream—in the running direction (2) of the strip—of the applicator device (3) or, where present, of the device (4) disposed drying device (5). The distance between the applicator device (3) and the drying device (5), with account being taken of the strip speed, determines the time for which the formulation acts on the metal surface.

The drying device (5) may, for example, be a forced air drier or an IR drier. The drying temperature is adjusted by the skilled worker in accordance with the formulation (F) used and with the desired properties of the coat. A temperature that has become established is one from 25 to 95° C. and preferably 30 to 80° C., in each case measured as the peak metal temperature. The temperature of the forced air in a forced air drier may of course also be higher.

After the metal strip has passed through the drying device (5) it bears a dried finish coat, the term dried, of course, not ruling out the possibility of small amounts, more particularly traces, of the solvent still being present in the coat.

In accordance with the invention the nonmetallic finish coat on the metal surface has a coat thickness of less than 3 µm, preferably less than 2 µm. The coats in question are more particularly coats which have a coat thickness of 1 nm to 1000 nm, preferably 5 nm to 500 nm and more preferably 10 nm to 300 nm. In the case of coats which are dried, these data are based on the dry coat thickness.

The coat thickness may be controlled by the skilled worker by means of measures that are known in principle, such as, for example, via the amount of formulation (F) applied and also its concentration. Further possibilities for regulation lie in the appropriate setting of the device (4), such as the distance of the rolls from one another, for example, when (4) comprises a pair of rolls (4) and (4'), or the distance of a doctor blade from the surface of the strip metal, where (4) comprises a doctor blade. The coat thickness chosen is based in each case on the desired properties of the coat.

In accordance with the invention the apparatus employed comprises downstream of the applicator device (3) or—if present—of a smoothing device (4) or of a drying station (5)—as viewed in the running direction of the strip—at least one IR sensor (6). The IR sensor operates in reflection geometry and faces a coated side of the strip. One possible arrangement is shown by FIG. 2. Using the IR sensor, the thickness of the applied finished coat, an applied passivation coat or an applied oil coat, for example, can be detected continuously, i.e., while the strip is moving.

The apparatus may also be equipped with two or more IR sensors. If both the top side and bottom side of the strip (1) are being coated, sensors may be disposed on the top side and on the bottom side of the strip. This is depicted exemplarily in FIG. 3. It will be appreciated that it is also possible in each case to use two or more IR sensors per side: for example, two or more IR sensors distributed over the width of the metal strip. Thus, for example, 3 IR sensors can be distributed over the width of the strip, and hence differences can be detected in the thickness of the coating in different areas of the strip.

The IR sensors (6) used comprise at least one broadband-emitting IR source (9) and also at least one IR multichannel detector (10) which comprises at least two measurement channels.

By broadband-emitting IR sources are meant all IR radiation sources which emit the entire IR spectrum or at least a subregion thereof, especially the region of the mid-infrared (MIR, 4000 $cm^{-1}$–200 $cm^{-1}$). With preference it is possible to use IR radiation sources which give out the emission spectrum of a black body. Lasers, which emit only defined wavelengths, are not suitable for performing the invention. In principle it is possible to use conventional IR lamps, but it is preferred to use emitters which employ thin thermoresistive films, such as a film of amorphous carbon, for example, on a suitable support, as a generator of the IR radiation. IR emitters of this kind are available commercially and are less sensitive to vibration than IR lamps with incandescent wires.

The IR sensor (6) used in accordance with the invention generally has 1 to 16 IR sources, with sensors having 4 to 8 IR sensors having proven particularly appropriate. On the one hand the number of IR sources determines the intensity of the radiation, and on the other hand, a great number of radiation sources also leads to more uniform irradiation of the strip surface and, consequently, to measurement results of better quality.

In the case of the multichannel detector (10) there are a plurality of IR detectors combined to form a compact measurement unit, and so an IR beam incident on the detector can be analyzed by means of a plurality of measurement channels. The multichannel detector comprises at least two measurement channels, preferably 2 to 6 channels and more preferably 2 to 4, and very preferably 2 or 4, channels.

Each of the measurement channels is equipped with an IR filter (11) mounted upstream of the measurement channel in question. The filters are each transmissive only for a particular IR wavelength range. Generally speaking, the FWHM (full width at half-maximum) of the IR-transmissive range is 50 to 250 nm. Filters of this kind which are transmissive only for a relatively narrow region of the IR spectrum ("narrow band pass filters") can be manufactured on the basis of silicon or germanium substrates and are available commercially for a host of different wavelength ranges. In accordance with the invention the detector comprises at least two different IR filters, and with, preferably, each of the measurement channels being equipped with a different filter.

For the present application it has proven appropriate to measure in the range from 2000 to 5000 $cm^{-1}$, preferably 2500 to 4000 $cm^{-1}$. The IR filters are selected accordingly by the skilled worker in such a way that the individual measurement channels capture different subregions of the stated total range.

The IR sources (9) and the multichannel detector (10) are disposed in the sensor (6) spatially in such a way that the IR source or sources (9) emit IR radiation toward the coated strip surface, this radiation being partly reflected from the strip surface—depending on the nature of the IR absorption of the finish coat—and the reflected radiation is measured by the IR multichannel detector (10).

Figure 6:
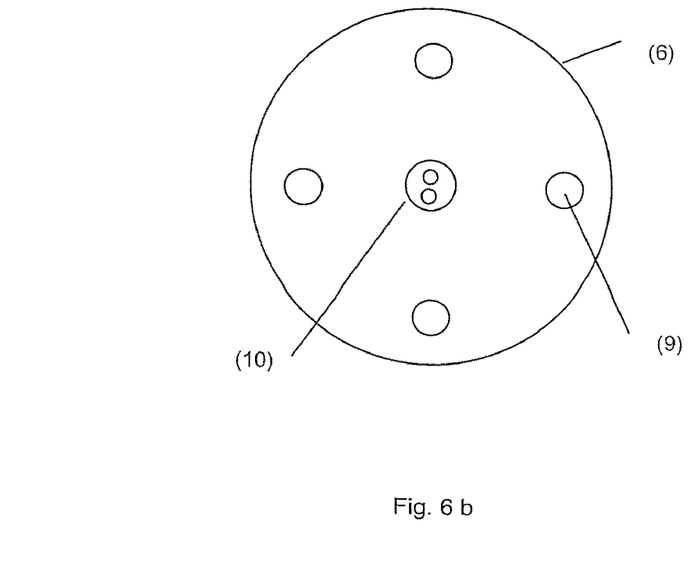
FIG. 6: Schematic representation of the underside of an IR sensor (6) with 8 IR sources (FIG. 6a) and with 4 IR sources (FIG. 6b)
Figure 6A:
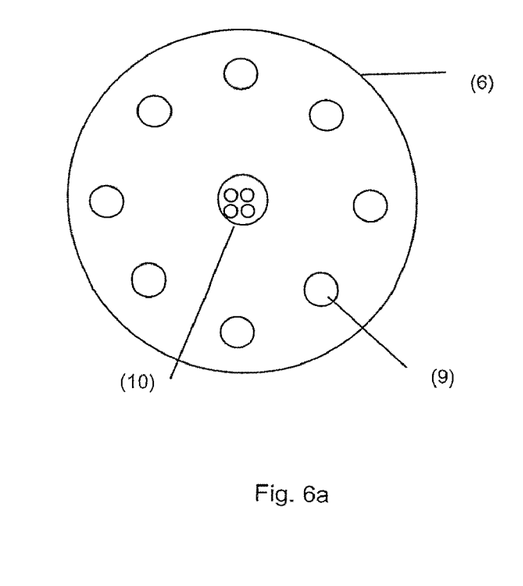

FIG. 6 shows, schematically, a view of the underside of one preferred embodiment of the IR sensor (6). The multichannel detector (10) is disposed centrally, and the IR sources (9) surround the multichannel detector (10) concentrically. 6a shows an arrangement with 8 IR sources and a 4-channel detector; FIG. 6b shows an arrangement with 4 IR sources and a 2-channel detector.

Figure 7:
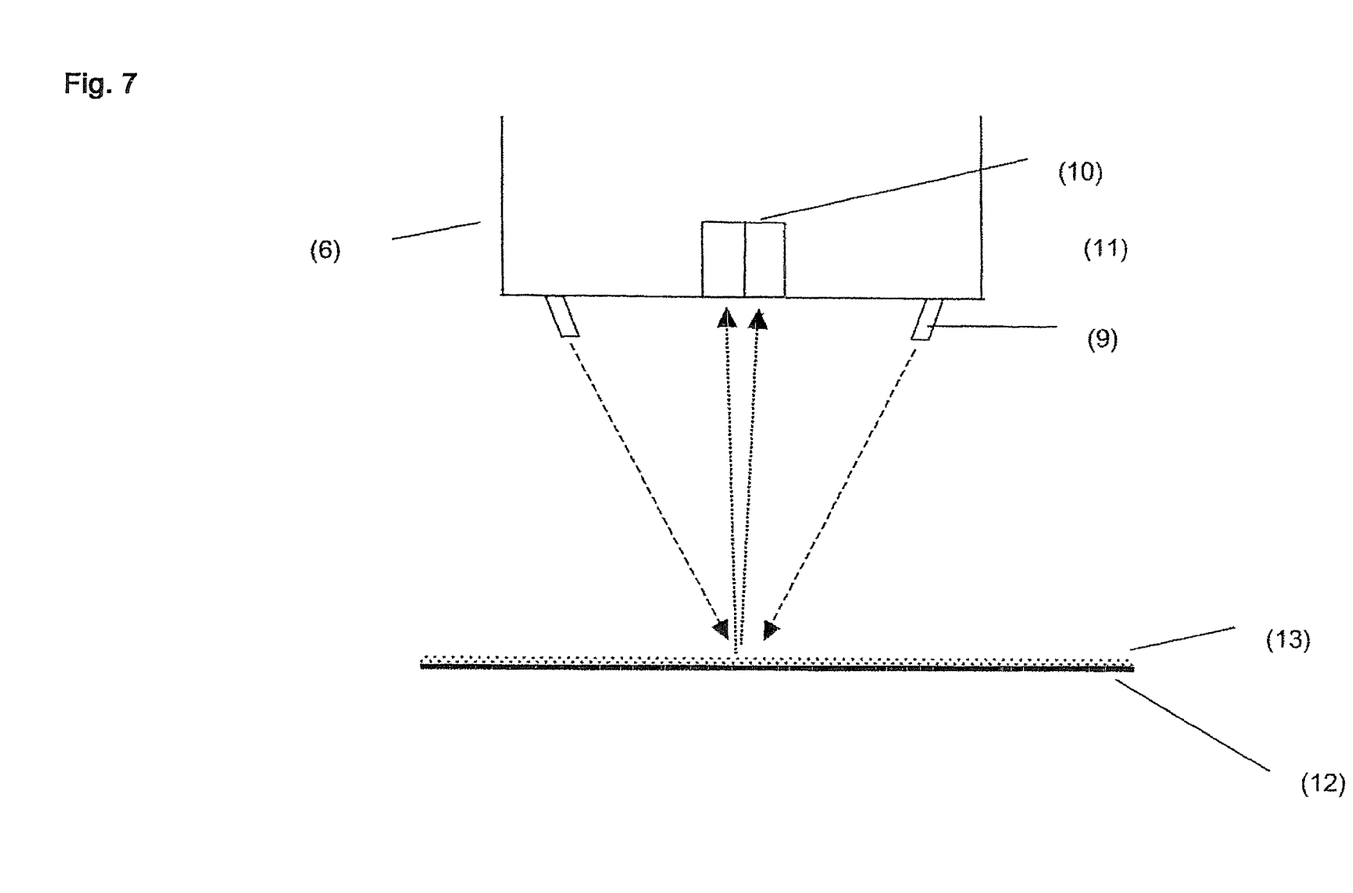
FIG. 7: Schematic representation of the measuring operation with the IR sensor (6)

FIG. 7 shows, schematically, a measurement using the detector. The IR sources (9) are inclined slightly toward one another, and emit IR radiation to a metal strip (12) which has been provided with a finish coat (13), this emission being such that the individual IR emitters form a highly homogeneous measuring spot on the strip surface. From there, the radiation is reflected to the multichannel detector (10)—FIG. 7 depicts a two-channel detector having two different IR filters (11).

In contrast to an IR spectrometer, the IR sensor (6) described has no moving parts and, accordingly, is very insensitive to vibrations.

The IR sources (9) here ought to be adjusted so that the measurement spot on the metal surface coated with the finish coat has a diameter of generally several millimeters, such as 5 to 30 mm, for example.

The distance of the IR sensor from the metal strip ought not to be too small, so that the detector is not damaged by any flapping movements or weld seams in the strip. A distance from the point of exit of the radiation from the IR sensor to the metal surface of 20 to 250 mm, preferably 25 to 200 mm, more preferably 30 to 180 mm, and very preferably 30 to 120 mm, has proven appropriate. The greater the distance of the IR sensor (6) from the strip surface, the greater should be the number of IR sources (9) as well.

From the measurement of the intensity of the reflected radiation by the IR multichannel detector it is possible, by means of an arithmetic unit, to determine the coat thickness of the finish coat. The arithmetic unit in question may preferably be internal to the sensor, but may also be a separate arithmetic unit. Where two or more IR sensors (9) are used for simultaneous coat-thickness determination at two or more points on a strip, the individual coat thicknesses may be transmitted from the respective sensors to a central control unit, or from the individual sensors to a concentrator unit and from there to a central control unit.

Figure 4:
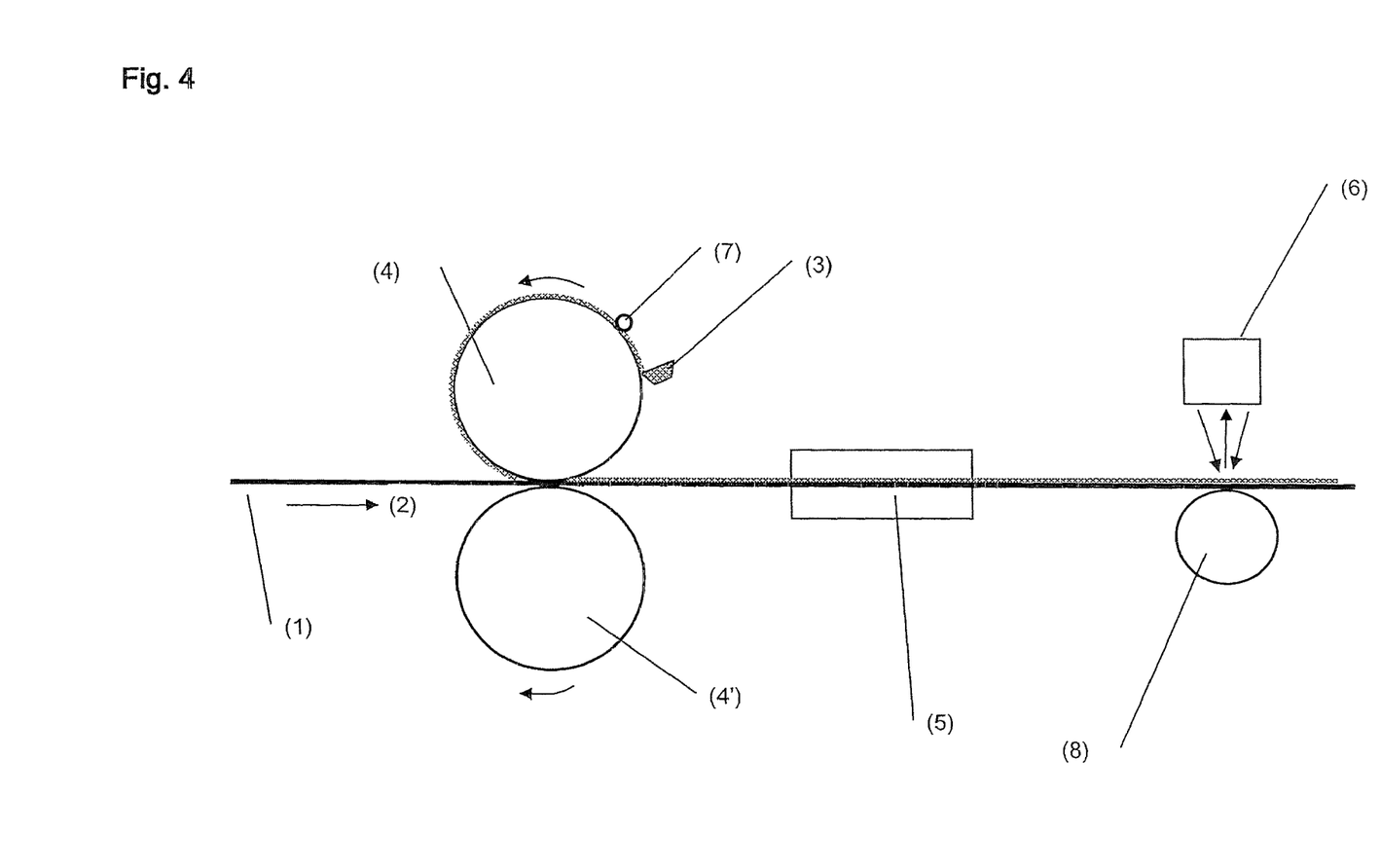
FIG. 4: Schematic representation of key elements of the method of the invention, single-sided application, different mode of application, with additional support roller
Figure 5:
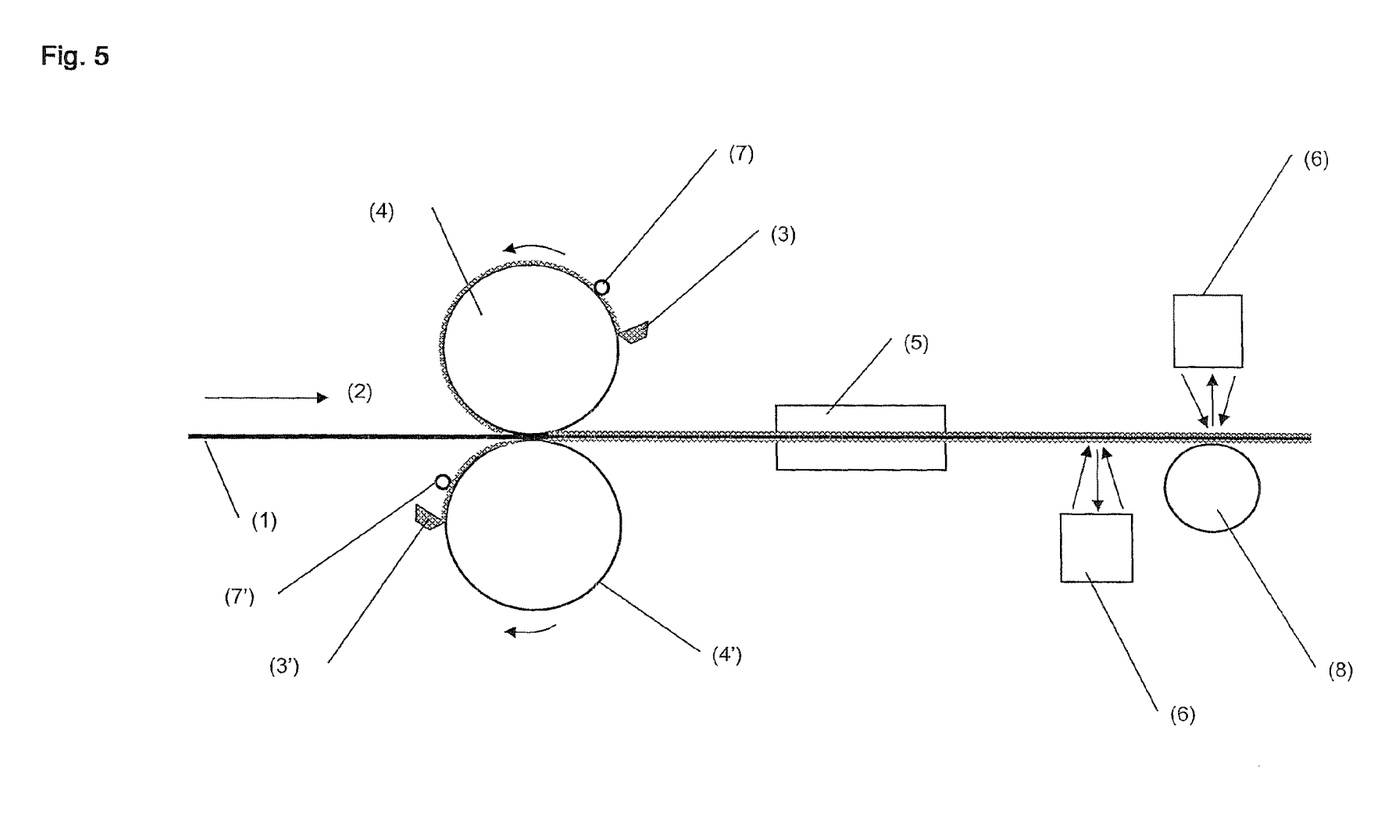
FIG. 5: Schematic representation of key elements of the method of the invention, double-sided application, with additional support roller

In a further-preferred embodiment the metal strip is supported at or near the site of the IR measurement with at least one additional support roller or deflection roller (8). Metal strips in a strip coating line may execute flapping movements, which could disrupt the IR measurement. A support roller or deflection roller (8) allows such flapping movements to be suppressed or at least attenuated. The term "support roller" means a roller which supports a metal strip running linearly, more particularly horizontally, without the roller altering the running direction of the strip; a deflection roller simultaneously alters the running direction of the strip to a greater or lesser extent. This embodiment of the invention is shown by way of example in FIGS. 4 and 5. The support roller or deflection roller (8) is located on the side of the metal strip remote from the IR measurement—for example directly beneath the IR measurement. An arrangement of this kind is not mandatory, however; it is enough for the roller to be disposed near enough to the IR measurement that it is able effectively to suppress or at least attenuate flapping movements. Generally speaking, the smaller the distance, the better the results obtained. As a general rule, the distance of the support roller or deflection roller (8) from the measuring site ought to be not more than 4 m, preferably not more than 1 m.

By means of the measurement apparatus described it is possible to determine the thickness of the applied coating while the metal strip is moving. The greater the thickness of the finish coat applied, the greater the extent of its absorption and the less, correspondingly, the fraction of reflected IR radiation which is recorded again by the IR sensor.

Formulations (F)

The liquid formulations (F) used may comprise any kinds of formulations allowing finish coats to be applied to metal strips.

They may, for example, be anticorrosion oil, rolling oil and/or forming oil formulations. Such oils may comprise typical additives and/or auxiliaries, as for example corrosion inhibitors.

Liquid formulations (F) which comprise at least one solvent and also coating-forming components are preferably used. Preferably they are aqueous formulations.

As a solvent the formulations (F) comprise preferably only water. It may further comprise small amounts of water-miscible organic solvents. Examples include monoalcohols such as methanol, ethanol or propanol, higher alcohols such as ethylene glycol or polyether polyols, ether alcohols such as butyl glycol or methoxypropanol and N-methylpyrrolidone. In general, however, the amount of water is at least 80%, preferably at least 90% and very preferably at least 95% by weight. The figures are based in each case on the total amount of all solvents.

The coating-forming components may be, for example, dissolved metal ions or metal compounds, which are deposited on the surface in the form of oxides and/or hydroxides, for example, and more particularly may be compounds of the elements Zn, Mg, Al, Cr, Ni, Co, Mo, Mn, W, Si, Zr or Ti. The coating-forming components additionally may be organic components. Examples of organic components include waxes or oils and also polymers which in particular are water-soluble or at least water-dispersible.

In one preferred embodiment of the invention the formulation (F) comprises at least one component selected from the following group of components:
1. hexafluorometallates $[MF_6]^{2-}$ where M=Ti, Si, Zr,
2. oxometallates of aluminum, molybdenum, chromium, tungsten, and manganese,
3. salts comprising the cations of Ca, Mg, Zn, Ni, Fe, Ni, Cr,
4. salts comprising the anions $NO_3^-$, $NO_2^-$, $PO_4^{3-}$, $HPO_4^{2-}$, $H_2PO_4^-$, $SO_4^{2-}$, $SO_3^-$, $CO_3^{2-}$, $HCO_3^-$ or $CH_3COO^-$,
5. rolling oils and corrosion control oils,
6. waxes,
7. organic film formers,
8. polymers and copolymers, obtainable from at least one of the following components
   $C_3$, $C_4$ or $C_5$ carboxylic acids having one or two double bonds, especially
   acrylic acid;
   acrylic esters;
   unsaturated sulfonic acids, phosphonic acids, phosphonic esters;
   vinylpyrrolidone, vinylimidazole, vinyl acetate, acrylamide and N-substituted derivatives of acrylamide;
   ethylenimine.

The formulations (F) may, for example, be aqueous metalworking fluids with a pH>7 which as well as water comprise at least oils and/or waxes and also corrosion inhibitors. Formulations of this kind serve, for example, to reduce the friction coefficient during deformation.

In one preferred embodiment of the invention the surface treatment in question is a passivation, preferably the passivation of galvanized steel strips. Formulations for passivation are known in principle to the skilled worker.

In one embodiment of the invention the treatment may be a phosphate passivation using an aqueous formulation (F) having a pH≦5, the formulation comprising as well as water at least phosphoric acid and/or phosphate and also at least one metal ion. The metal ions may be, preferably, at least metal ion selected from the group of $Cr^{3+}$, $Zn^{2+}$, $Mg^{2+}$, $Ca^{2+}$ or $Al^{3+}$, preferably $Cr^{3+}$, $Zn^{2+}$, $Mg^{2+}$, $Ca^{2+}$ or $Al^{3+}$.

In one preferred embodiment of the invention an aqueous, acidic formulation (F) having a pH≦5 which comprises at least one water-soluble or water-dispersible polymer is used for passivating. Preference is given to using water-soluble polymers.

The acidic pH may come about because the polymer itself contains acidic groups in sufficient amount; or else the formulation (F) employed may comprise not only the water-soluble or water-dispersible polymers but also inorganic or organic acids or mixtures thereof. There is no limit on the selection of such acids, with the proviso that there are no adverse effects, together with the other components of the formulation. The skilled worker selects accordingly. Examples of suitable acids include phosphoric acid, phosphonic acid or organic phosphonic acids such as 1-hydroxyethane-1,1-diphosphonic acid (HEDP), 2-phosphonobutane-1,2,4-tricarboxylic acid (PBTC), aminotri (methylenephosphonic acid) (ATMP), ethylenediaminetetra (methylene-phosphonic acid) (EDTMP) or diethylenetriaminepenta(methylenephosphonic acid) (DTPMP), sulfonic acids such as methanesulfonic acid, amidosulfonic acid, p-toluenesulfonic acid, m-nitrobenzenesulfonic acid and derivatives thereof, nitric acid, formic acid, and acetic acid. In principle it is also possible to use unsaturated acids such as acrylic acid, methacrylic acid, maleic acid, itaconic acid, vinylphosphonic acid, and acrylamidopropylsulfonic acid. Preference is given to phosphorus acids such as $H_3PO_4$, phosphonic acid, the stated organic phosphonic acids, $HNO_3$ or methanesulfonic acid. The acid in question may preferably be $H_3PO_4$ or another phosphorus acid.

The formulation (F) used with preference for passivating comprises generally 10 to 35%, preferably 12 to 35%, more preferably 14 to 32%, and very preferably 16 to 28% by weight of the water-soluble polymers, based on the amount of all the components of the formulation (i.e. including the solvents).

The formulation (F) used with preference for passivating has a pH of not more than 5, more particularly a pH of 0.5 to 5, preferably 0.8 to 3.5. As would be expected, the pH of the preparation depends on the nature and concentration of the polymers used. It may also be influenced by further basic or acidic components in the formulation.

Besides the polymer and, where used, the acid, the formulation (F) used for passivating may optionally comprise metal ions or metal compounds.

The metal ions may be at least one metal ion selected from the group of Cr, Zn, Mg, Ca, Al, Mn, Mo, Co, Ni, Fe, Ti, Si, Zr, preferably selected from the group of Zn, Mg, Ca or Al. Besides this, the preparation preferably comprises no further metal ions. The ions may be present either as hydrated metal ions or alternatively in the form of dissolved compounds, such as complex compounds, for example. In particular the ions may feature complex bonds to the acidic groups of the polymer.

The amount of the metal ions from the group of Cr, Zn, Mg, Ca, Al, Mn, Mo, Co, Ni, Fe, Ti, Si, Zr, if present, is 0.01% to 20% by weight, preferably 0.5 to 18% by weight and more preferably 1 to 15% by weight, in each case based on the total amount of all the polymers X in the formulation.

The formulation may further comprise at least one dissolved phosphate ion. This ion may be any kind of phosphate ions. The ions in question may, for example, be orthophosphates or diphosphates. To the skilled worker it is clear that, depending on the pH and concentration, in aqueous solution there may be an equilibrium between the various dissociation states of the ions. The formulation may further comprise methanesulfonate ions.

Where phosphate ions are present, the metal ions and phosphate ions may be used preferably in the form of soluble salts which contain both ions. Examples of compounds of this kind include $Zn_3(PO_4)_2$, $ZnH_2PO_4$, $Mg_3(PO_4)_2$ or $Ca(H_2PO_4)_2$ and/or corresponding hydrates thereof.

Alternatively the metal ions and phosphate ions may be added separately from one another, For example, the metal ions can be used in the form of the corresponding nitrates, alkanesulfonates or carboxylates, acetates for example, and the phosphates can be used in the form of phosphoric acid. It is also possible to use insoluble or sparingly soluble compounds, such as the corresponding carbonates, oxides, oxide hydrates or hydroxides, for example, which are dissolved under the influence of acid.

In a similar way it is possible to use metal ions and methane sulfonate ions jointly in the form of metal salts of methane sulfonic acid, such as $Zn(CH_3SO_3)_2$, for example, or else to use them separately in the form of other metal salts and methane sulfonic acid.

The amount of the phosphate ions and/or methane sulfonate ions in the formulation is laid down by the skilled worker in accordance with the desired properties of the formulation. The amount, where present, is generally 0.01% to 20% by weight, preferably 0.5 to 25% by weight, more preferably 1 to 25% by weight, reckoned in each case as orthophosphoric acid and based in each case on the water-soluble polymers.

The formulation may optionally further comprise at least one wax in dispersion in the formulation. It will be appreciated that mixtures of different waxes can also be used. The term "wax" here encompasses not only the wax itself but also any auxiliaries that may be used to form a wax dispersion. The skilled worker is aware of waxes for use in aqueous dispersions, and selects appropriately. The waxes may, for example, be montan waxes, polyethylene waxes, waxes based on oxidized polyethylene, on fluorinated polyethylene such as PTFE or on other polymers based on C, H and F. The term "polyethylene" is additionally intended to encompass copolymers of ethylene and other monomers, more particularly other olefins such as propylene, for example. Ethylene copolymers of this kind preferably comprise at least 65% by weight of ethylene. Through the addition of waxes it is possible to achieve an advantageous lowering in the friction of the surface with the surface of the tools that are used for reforming.

The amount of optionally employed waxes is determined by the skilled worker in accordance with the desired properties of the passivation coat. An established quantity, in general, is from 0.01 to 70% by weight, preferably 0.5 to 25% by weight and more preferably 1 to 10% by weight, based in each case on the water-soluble polymers.

Further components which can be employed optionally for the formulation include surface-active compounds, corrosion inhibitors, complexing agents or typical galvanizing assistants.

From among the optional components that are possible in principle, the skilled worker selects them, and their amounts in accordance with the desired application. The amount of optional components, besides water-soluble polymers, ought not, however, as a general rule, to be more than 20% by weight, preferably not more than 10% by weight and more preferably not more than 5% by weight, based on the polymers.

The formulations (F) for use in accordance with the invention may be obtained by simple mixing of the components. If waxes are used, they are preferably initially dispersed separately in water and mixed as a dispersion with the other components. Wax dispersions of this kind are also available commercially.

In one preferred embodiment of the invention the water-soluble polymers are polymers X comprising acidic groups or polymers Y comprising basic groups.

Formulations with Polymers X

The acidic polymers X preferably contain at least 0.6 mol of acid groups/100 g of the polymer. This quantity figure is based on the free acid groups. Preferably the polymers contain at least 0.9 mol of acid groups/100 g, more preferably at least 1 mol/100 g and very preferably at least 1.2 mol/100 g.

The acidic groups of the polymers X are selected in general from the group of carboxyl groups, sulfonic acid groups, phosphoric or phosphonic acid groups. Preferably they are carboxyl groups, phosphoric or phosphonic acid groups. The polymer X employed preferably comprises at least COOH groups. With particular preference the polymer X employed is a copolymer of at least two different monomers containing acid groups.

When the acidic polymers X are used, the acidity of the formulation employed ought to be brought about substantially as a result of the acid groups of the polymer. The amount of additional acids besides the polymers X in the formulation ought therefore generally not to exceed 50% by weight relative to the amount of all the polymers X in the formulation together. Preferably a figure of 30% by weight, more preferably 20% by weight and very preferably 10% by weight ought not to be exceeded. In a second, particularly preferred embodiment of the invention there are no additional acids present.

The acid groups of the polymer X ought preferably to take the form of free acid groups. To a minor extent, however, they may also be neutralized by means of bases, such as ammonia, amines, amino alcohols or alkali metal hydroxides, for example. Partial neutralization of this kind may be performed for the purpose of pH adaptation. It may also, however, take place automatically as part of the preparation of the polymer. The skilled worker is aware, for example, that it may be necessary to neutralize some of the acid groups in the course of the preparation of polymers rich in acid groups, in order to force incorporation of the monomers into the polymer.

In no way, however, should the degree of neutralization be too high, so as to ensure effective acid attack on the zinc surface. As a general rule, therefore, not more than 25 mol % of the acid groups present in the polymer X ought to be neutralized, preferably not more than 20 mol % and more preferably not more than 12 mol %.

To perform the invention it is particularly preferred to use homopolymers or copolymers X which comprise (meth) acrylic acid units.

In one particularly preferred embodiment of the invention the polymer X comprises one or more water-soluble copolymers X1 formed from (meth)acrylic acid units (A) and monoethylenically unsaturated monomers with acid groups (B) differing therefrom. Optionally it is possible additionally for there to be (meth)acrylic esters (C) containing OH groups and/or further monomers (D) as structural units. Over and above these there are no further monomers present. The amount of (meth)acrylic acid (A) in the copolymer X1 is 30% to 90% by weight, preferably 40% to 80% by weight and more preferably 50% to 70% by weight, this figure being based on the sum of all of the monomers in the polymer.

The monomer (B) is at least one monoethylenically unsaturated monomer which is different than but copolymerizable with (A) and contains one or more acidic groups. It will be appreciated that two or more different monomers (B) may also be employed. The acidic groups in monomer (B) may preferably be a group selected from the group of carboxyl groups, phosphoric acid groups, phosphonic acid groups or sulfonic acid groups. Preferably it is a group selected from the group of carboxyl groups, phosphoric acid groups or phosphonic acid groups. Examples of monomers of this kind include crotonic acid, vinylacetic acid, $C_1$-$C_4$ monoesters of monoethylenically unsaturated dicarboxylic acids, styrenesulfonic acid, vinylsulfonic acid, allylsulfonic acid, 2-acrylamido-2-methyl-1-propanesulfonic acid (AMPS), vinylphosphonic acid, monovinyl phosphate, maleic acid, fumaric acid or itaconic acid. The amount of the monomers (B) in the copolymer X1 is 10% to 70%, preferably 20% to 60%, and more preferably 30 to 50% by weight, based in each case on the sum of all of the monomers in the polymer.

In one preferred embodiment of the invention the monomers (B) are monoethylenically unsaturated dicarboxylic acids having 4 to 7 carbon atoms (B1) and/or monoethylenically unsaturated phosphoric and/or phosphonic acids (B2).

Examples of monomers (B1) include maleic acid, fumaric acid, methylfumaric acid, methylmaleic acid, dimethylmaleic acid, methylenemalonic acid or itaconic acid. The monomers may, if desired, also be used in the form of the corresponding cyclic anhydrides. Preference is given to maleic acid, fumaric acid and itaconic acid, particular preference to maleic acid and/or maleic anhydride.

Examples of monomers (B2) include vinylphosphonic acid, monovinyl phosphate, allylphosphonic acid, monoallyl phosphate, 3-butenylphosphonic acid, mono-3-butenyl phosphate, mono(4-vinyloxybutyl) phosphate, phosphonoxyethyl acrylate, phosphonoxyethyl methacrylate, mono(2-hydroxy-3-vinyloxypropyl) phosphate, mono-(1-phosphonoxymethyl-2-vinyloxyethyl) phosphate, mono(3-allyloxy-2-hydroxypropyl) phosphate, mono(2-allyloxy-1-phosphonoxymethylethyl) phosphate, 2-hydroxy-4-vinyloxymethyl-1,3,2-dioxaphosphole, and 2-hydroxy-4-allyloxymethyl-1,3,2-dioxaphosphole. The monomer in question is preferably vinylphosphonic acid, monovinyl phosphate or allylphosphonic acid, more preferably vinylphosphonic acid.

The copolymer X1 may further optionally comprise at least one (meth)acrylic ester (C) containing OH groups. Preference is given to monohydroxy (meth)acrylic esters.

Preferably the monomers (C) comprise at least one (meth)acrylic ester of the general formula $H_2C=CHR^1-COOR^2$, where $R^1$ stands in a manner known in principle for H or methyl, and $R^2$ is selected from the group of $R^{2a}$, $R^{2b}$ or $R^{2c}$.

The radicals $R^{2a}$ are radicals of the general formula $-(R^3-O-)_n-H$. In this formula n stands for a natural number from 2 to 40. Preferably n stands for 2 to 20 and more preferably for 2 to 10. The radicals $R^3$ stand in each case independently of one another for a divalent, straight-chain or branched alkyl radical having 2 to 4 C atoms. Examples include, in particular, 1,2-ethylene radicals, 1,2-propylene radicals, 1,2-butylene radicals and 1,4-butylene radicals. It will be appreciated that they may also be mixtures of different radicals. Preferably they are 1,2-ethylene and/or 1,2-propylene radicals. With particular preference they are exclusively 1,2-ethylene radicals. Preference is given furthermore to radicals ($R^{2a}$) which contain both 1,2-ethylene and 1,2-propylene radicals, the amount of the ethylene radicals being at least 50%, preferably at least 70% and more preferably at least 80% based on the total number of all the radicals $R^3$. Examples of radicals $R^{2a}$ include $-CH_2-CH_2-O-CH_2-CH_2-O-CH_2-CH_3$, $-CH_2-CH(CH_3)-O-CH_2-CH(CH_3)OH$, $-CH_2-CH(CH_3)-O-CH(CH_3)-CH_2OH$, $-CH(CH_3)-CH_2-O-CH(CH_3)-CH_2OH$ or $-CH(CH_3)-CH_2-O-CH_2-CH(CH_3)OH$.

The radicals $R^{2b}$ are radicals of the general formula $-R^4-(OH)_m$. In this formula III stands for a natural number from 1 to 6, preferably from 1 to 4, more preferably 1 to 3 and, for example, 1 or 2. The radical $R^4$ stands for an (m+1)-valent, straight chain or branched alkyl radical having 2 to 10 C atoms, preferably 2 to 6 C atoms and more preferably 2 to 4 C atoms.

The alkyl radical is substituted by at least one OH group with the proviso that there is not more than one OH group X per C atom in $R^4$. Examples of suitable radicals $R^{2b}$ with OH groups include linear radicals of the general formula $-(CH_2)_m-OH$ such as $-CH_2-CH_2-OH$, $-CH_2-CH_2-CH_2-OH$, $-CH_2-CH_2-CH_2-CH_2-OH$ or $-CH_2-CH_2-CH_2-CH_2-CH_2-CH_2-OH$.

Particularly preferred radicals $R^{2b}$ for the performance of the invention are radicals selected from the group of $-CH_2-CH_2-OH$, $-CH_2-CH_2-CH_2-OH$, $-CH_2-CH_2-CH_2-CH_2-OH$, $-CH_2-CH(CH_3)-OH$, $-CH(CH_3)-CH_2-OH$ or $-CH_2-CH(OH)-CH_2-OH$.

In a further, preferred embodiment of the invention at least one of the radicals $R^{2b}$ is a branched alkyl radical of the general formula $-R^5-CH(R^6)OH$. In this formula $R^5$ and $R^6$ each stand for a linear or branched alkyl radical having 1 to 8 C atoms, preferably 1 to 6 C atoms and more preferably 1 to 4 C atoms, with the proviso that the sum of the C atoms in $R^5$ and $R^6$ is not more than 9. Preferably $R^5$ and $R^6$ are each linear alkyl groups. With particular preference $R^6$ is a methyl group. It may be, for example, $-CH_2-CH(CH_3)-OH$. In branched (meth)acrylic esters of this kind there is a distinct reduction in the tendency of the OH group to form further ester bonds with other COOH-containing monomers. Very particular preference is given to $-CH_2-CH(CH_3)-OH$ and/or $-CH(CH_3)-CH_2-OH$, more particularly a mixture of both radicals. (Meth)acrylic esters with radicals of this kind may be obtained in a simple way, for example by esterification of (meth)acrylic acid with 1,2-propylene glycol.

The radicals $R^{2c}$ are monosaccharide or oligosaccharide radicals, preferably monosaccharide radicals. The saccharides in question may in principle be of any kind. With preference it is possible to use radicals derived from pentoses and hexoses, more particularly from hexoses. Examples of suitable monosaccharides include glucose, mannose, galactose, fructose or ribose. Preference is given to using radicals derived from glucose. They may also be derivatives of the saccharides, examples being products which originate from the saccharides through reduction or oxidation. The species in question may be more particularly sugar acids such as gluconic acid, for example.

The amount of the monomers (C) in the copolymer X1 is 0% to 40%, preferably 1% to 30% by weight.

Besides the monomers (A), (B), (C) and also, where used, (D) it is possible optionally to use 0% to 30% by weight of at least one further ethylenically unsaturated monomer (D) different than (A), (B) and (C). Other than these there are no monomers employed.

The purpose of the monomers (D) is to fine-tune the properties of the copolymer X1. It is of course also possible to use two or more different monomers (D). They are selected by the skilled worker in accordance with the desired properties of the copolymer and additionally with the proviso that they must be copolymerizable with the monomers (A), (B) and (C).

Preferably they are monoethylenically unsaturated monomers. In special cases, however, it is also possible to use small amounts of monomers having two or more polymerizable groups. This allows the copolymer to be crosslinked to a small extent.

Examples of suitable monomers (D) include in particular aliphatic alkyl esters of (meth)acrylic acid, such as methyl (meth)acrylate, ethyl (meth)acrylate, butyl (meth)acrylate or 2-ethylhexyl (meth)acrylate. Additionally suitable are vinyl or allyl ethers such as methyl vinyl ether, ethyl vinyl ether, propyl vinyl ether, 2-ethylhexyl vinyl ether, vinyl cyclohexyl ether, vinyl-4-hydroxybutyl ether, decyl vinyl ether, 2-(diethylamino)ethyl vinyl ether, 2-(di-n-butylamino)ethyl vinyl ether or methyl diglycol vinyl ether and the corresponding allyl compounds. It is likewise possible to employ vinyl esters such as vinyl acetate or vinyl propionate, for example. Basic comonomers, can be used as well, such as acrylamide and alkyl-substituted acrylamides, for example.

Examples of crosslinking monomers include molecules having two or more ethylenically unsaturated groups, examples being di(meth)acrylates such as ethylene glycol di(meth)acrylate or butane-1,4-diol di(meth)acrylate or poly (meth)acrylates such as trimethylolpropane tri(meth)acrylate or else di(meth)acrylates of oligoalkylene or polyalkylene glycols such as di-, tri- or tetraethylene glycol di(meth)acrylate. Further examples include vinyl (meth)acrylate or butanediol divinyl ether.

The amount of all the monomers (D) used together is 0% to 30% by weight, based on the total amount of the monomers employed. Preferably the amount is 0% to 20% by weight, more preferably 0% to 10%. If crosslinking monomers (D) are present their amount ought in general not to exceed 5%, preferably 2%, by weight, based on the total amount of all of the monomers used for the method. The amount may, for example, be 10 ppm to 1% by weight.

In a first preferred embodiment of the invention, the copolymer X1 comprises, as well as (A), at least one monomer (B). Preferably there are, besides the monomers (A) and (B), further monomers (C) or (D). In the case of this embodiment, the amount of (A) is preferably 60 to 90% and the amount of (B) 10 to 40% by weight. With particular preference in this embodiment, the copolymer X1 is a copolymer of acrylic acid and maleic acid or acrylic acid and itaconic acid in the aforementioned amounts.

In a second preferred embodiment of the invention the copolymer X1 comprises, as well as (A), at least one monomer (B1) and at least one monoether (B2). Additionally with particular preference there are, besides the monomers (A), (B1) and (B2), no further monomers (D). In the case of this embodiment, the amount of (A) is preferably 50% to 90%, the amount of (B1) 5% to 45%, the amount of (B2) 5% to 45% and the amount of (D) is 0% to 20% by weight. With particular preference the copolymer X1 is a copolymer of acrylic acid, maleic acid and vinylphosphonic acid in the aforementioned amounts.

In a third, preferred embodiment of the invention the copolymer X1 comprises as well as (A) at least one monomer (B2) and at least one monomer (C). In the case of this embodiment, the amount of (A) is preferably 20% to 60%, the amount of (B2) 20% to 60%, the amount of (C) 1% to 40%, and the amount of (D) 0% to 20% by weight. With particular preference the copolymer X1 is a copolymer of acrylic acid, vinylphosphonic acid and hydroxyethyl acrylate and/or hydroxypropyl acrylate.

The polymers X may be prepared by processes known to the skilled worker. Preferably the copolymers are prepared by free-radical polymerization of the stated components (A), (B) and optionally (C) and/or (D) in aqueous solution. Details of the conduct of a free-radical polymerization are known to the skilled worker. Preparation processes for the copolymers X1 are described, for example in WO 2006/021308 or in WO 2006/134116 from page 9, line 38 to page 13, line 24.

The synthesized copolymers X1 may be isolated from the aqueous solution by means of typical methods known to the skilled worker, such as by evaporation of the solution, spray drying, freeze drying or precipitation, for example. Preferably, however, the copolymers X1 are not isolated from the aqueous solution at all after the polymerization; instead, the copolymer solutions obtained are used—if desired following addition of further additives—as they are with the method of the invention. In order to facilitate such direct further use, the amount of the aqueous solvent used for the polymerization ought to be calculated from the start in such a way that the concentration of the polymer in the solvent is suitable for the application. It is also possible first to prepare a concentrate which only later, on site, is diluted to the desired concentration using water or, optionally, other solvent mixtures.

The molecular weight $M_w$ (weight average) of the polymers X and/or copolymers X1 used for the method of the invention is laid down by the skilled worker in accordance with the desired application. It is possible for example to use polymers having a molecular weight $M_w$ of 3000 to 1 000 000 g/mol. Polymers which have become established are more particularly polymers with 5000 g/mol to 500 000 g/mol, preferably 10 000 g/mol to 250 000 g/mol, more preferably 15 000 to 100 000 g/mol and very preferably 20 000 to 75 000 g/mol.

Formulations with Polymers Y

The polymers Y contain one or more different basic groups.

The basic groups are preferably at least groups comprising aliphatic and/or aromatic amino groups, and more preferably are heterocycles having 5-6 ring members and 1-3 nitrogen atoms.

In one preferred embodiment of the invention the polymer Y may be polyethylenimine (PEI) or derivatives of polyethylenimine. Derivatives may more particularly be N-functionalized derivatives of polyethylenimine, more particularly derivatives which contain $>N-(CH_2)_x-S$ groups, where x is preferably 1 or 2 and S is an acidic group, more particularly a carboxyl group or a phosphonic acid group. PEI derivatives of this kind may be obtained, for example, by reaction of non-functionalized PEI with acrylic acid or vinylphosphonic acid.

In a further preferred embodiment of the invention the polymers Y may be polymers based on corresponding vinyl compounds. Examples of suitable monomers for the synthesis of such polymers Y include vinylimidazole, vinyl lactams such as N-vinylcaprolactam, N-vinylpyrrolidone or other vinyl heterocycles such as vinylpyridine. The polymers in question are preferably polymers comprising vinylimidazole. Furthermore, they may also include other comonomers, such as alkyl acrylates or else monomers comprising acidic groups, for example. Basic polymers Y that are suitable for passivation are disclosed in WO 2004/081128, for example.

In order to achieve the desired acidic pH, additional acids are generally added to the formulation, as described above. Where the polymers Y contain, as well as the basic groups, a sufficient amount of additional acidic groups, it may be possible to do without the addition of acids if desired.

Coat Thickness Determination and System Control with the IR Sensor

With the method of the invention, the intensities of the IR radiation reflected from the strip surface that are measured by the IR sensor (6) are employed for determining the coat thickness. The determination is made on the basis of a comparison with a calibration plot.

In this case the IR filters (11) of the multichannel detector (10) are adapted to the nature of the formulation (F) employed. The skilled worker will make an appropriate selection in accordance with the components. Measurement takes place generally in regions which absorb IR particularly well.

In one preferred embodiment of the method of the invention, for the purpose of measurement, at least one region is selected, from the IR spectrum of the finish coat, that absorbs particularly well, and also, in addition, at least one region in which the finish coat has no IR absorption, or at least only weak IR absorption, and the multichannel detector (10) is equipped with the IR filters (11) corresponding to the regions selected. The additional measurement of a region with only weak IR absorption or none at all is used to eliminate background effects. Using both sets of data, it is possible to determine the relative increase in absorption in the strongly absorbing region. In the case of more than two measurement channels it is possible, for example, to carry out measurement of two or more bands or two or more blank values.

The data determined by the IR sensor (6) are evaluated in the sensor or in an external arithmetic unit and from those data the coat thickness is calculated, by comparison between the measured intensities or calculated result and a calibration plot. The calibration plot is specific to each formulation used. It can be obtained by applying the formulation (F) used in each case for the surface treatment, in different coat thicknesses, to a metal, measuring the IR data by means of the sensor (6) in each case, and determining the coat thickness by means of a method which is independent of that measurement.

Where two or more sensors are used for simultaneous coat-thickness determination at two or more points on a strip, the individual coat thicknesses may be transmitted from the respective sensors to a central control unit, or from the individual sensors to a concentrator unit and from there to a central control unit.

The coat thickness determined can be used to control the amount of formulation (F) to be applied and hence to obtain the desired target value for the coat thickness.

The method of the invention can be used with particular advantage when the finish coat comprises organic components. Bands which absorb in the preferred operating range of the IR sensor (6), from 2500 to 4000 $cm^{-1}$, are C—H bands in particular, and also O—H or N—H bands. With very particular advantage the method of the invention can be employed when the surface treatment is a passivation, and the formulation used for passivating comprises water-soluble or water-dispersible polymers. With particular preference it is possible, with this embodiment of the invention, to use the IR sensor to measure bands having maxima at 2500-3500 $cm^{-1}$. At 2500 to 3500 $cm^{-1}$, for example, there are C—H absorptions of the polymer backbone.

The following examples are intended to illustrate the invention exemplarily:

The following formulations were used for passivating:
Formulation I:
Aqueous formulation with 25% by weight of polyacrylic acid (M, about 40 000 g/mol, 1.39 mol of acid groups/100 g of polymer) and also 0.5% by weight of nitric acid based on the formulation. The pH of the formulation was 0.9.
Formulation II:
Aqueous formulation with 20% by weight of polyacrylic acid ($M_w$ about 40 000 g/mol, 1.39 mol of acid groups/100 g of polymer) and also 0.5% by weight of nitric acid based on the formulation. The pH of the formulation was 0.9.
Formulation III:
Aqueous formulation with 25% by weight of polyacrylic acid ($M_w$ about 40 000 g/mol, 1.39 mol of acid groups/100 g of polymer) and also 2.3% by weight of nitric acid based on the formulation. The pH of the formulation was 0.4.
Implementation of Passivation:

The formulations are each applied to a galvanized steel strip using a strip-coating line analogous to that of FIG. 1. The metal strip has a width of 1450 mm, and the strip speed is 105 m/min.

An IR sensor with 4 IR sources and also a 4-channel detector is used. The IR sensor is mounted at a distance of approximately 20 m after the drier, above the steel strip, at a distance of 30 mm from the strip surface. The 4-channel detector is equipped with filters for selection of IR radiation at 3400 nm (2941 $cm^{-1}$; FWHM 120 nm), 3950 nm (2531 $cm^{-1}$; FWHM 90 nm), 4450 nm (2247 $cm^{-1}$; FWHM 60 nm) and 4660 nm (2145 $cm^{-1}$; FWHM 180 nm). For the measurement, only the channels at 2941 $cm^{-1}$ and 2531 $cm^{-1}$ are used. The IR spectrum with the formulation exhibits relatively strong absorptions at 2941 $cm^{-1}$ and only slight absorptions at 2531 $cm^{-1}$.

The amount of formulation applied by spraying is the same in each case. Formulation I gives a finish coat with a thickness of about 0.6 μm, formulation II a thickness of about 0.3 μm, and formulation III a thickness of about 0.6 μm.

The invention claimed is:

1. A method for continuous surface treatment of a metal strip with a liquid formulation (F), in which a metal strip is moved longitudinally through an apparatus for surface treatment of metal strips that comprises at least one device for applying the formulation (F) and in which the formulation (F) is applied to the metal strip by means of the device, the amount of formulation to be applied being calculated so as to form a nonmetallic finish coat having a coat thickness of less than 3 μm on the metal surface, which method comprises equipping the apparatus employed, downstream of the device—as viewed in the running direction of the strip—with at least one IR sensor which faces a coated side of the strip, operates in reflection geometry, and comprises
at least one broadband-emitting IR source, and also
at least one IR multichannel detector comprising at least two measurement channels, each of the measurement channels being equipped with an IR filter which is mounted upstream of the measurement channel in question, and each of which is transmissive only for a particular wavelength range of the IR radiation with the proviso that at least two different IR filters are used,
and in which the IR source emits IR radiation toward the coated strip surface, the radiation is partly reflected from the strip surface, and the intensity of the reflected radiation is measured with the IR multichannel detector, and from the intensity measurement, by means of an arithmetic unit, the coat thickness of the finish coat is calculated.

2. The method according to claim 1, wherein the measured coat thickness is used to control the amount of formulation (F) to be applied.

3. The method according to claim 1, wherein the arithmetic unit is internal to the sensor.

4. The method according to claim 1, wherein the IR sensor comprises at last two IR sources which surround the detector concentrically.

5. The method according to claim 4, wherein the IR sensor has 4 to 10 IR sources.

6. The method according to claim 1, wherein the IR multichannel detector has 2 to 4 measurement channels.

7. The method according to claim 1, wherein the multichannel IR detector operates in the range from 2000 to 5000 $cm^{-1}$.

8. The method according to claim 1, wherein the metal strip is mounted, on its side remote from the IR sensor, with a support roller or deflection roller which is at a distance of not more than 4 m from the site of the IR measurement.

9. The method according to claim 1, wherein the metal strip is a steel strip or a galvanized steel strip.

10. The method according to claim 9, wherein the surface treatment is a passivation.

11. The method according to claim 10, wherein the treatment is a phosphate passivation using an acidic, aqueous formulation having a pH≦5 and comprising as well as water at least phosphoric acid and/or phosphate and also at least one metal ion.

12. The method according to claim 10, wherein passivation is carried out using an acidic, aqueous formulation having a pH≦5 and comprising as well as water at least one water-soluble or water-dispersible polymer.

13. The method according to claim 12, wherein said polymer is at least one water-soluble polymer X comprising acidic groups.

14. The method according to claim 13, wherein said acidic groups are —COOH— groups and/or salts thereof.

15. The method according to claim 12, wherein said polymer is a water-soluble polymer Y comprising basic groups.

16. The method according to claim 15, wherein said basic groups are a group comprising at least aliphatic and/or aromatic amino groups.

17. The method according to claim 16, wherein the basic group is a heterocycle having 5-6 ring members and 1-3 nitrogen atoms.

18. The method according to claim 12, in which the IR sensor is used to measure bands having maxima at 2500-3500 $cm^{-1}$ and/or at 1400-2000 $cm^{-1}$.

19. The method according to claim 18, wherein C—H bands are measured.

20. A method for continuous surface treatment of a metal strip with a liquid formulation (F), in which a metal strip is moved longitudinally through an apparatus for surface treatment of metal strips that comprises at least
a device for applying the formulation (F) and
a drying station,
in which the formulation (F) comprises at least one solvent and also coating-forming components, the formulation (F) is applied to the metal strip by means of the device, the solvents are at least partly removed by means of the drying station, the amount of formulation to be applied being calculated so as to form a nonmetallic finish coat having a dry coat thickness of less than 3 μm on the metal surface, which method comprises equipping the apparatus employed, downstream of the drying station—as viewed in the running direction of the strip—with at least one IR sensor which faces a coated side of the strip, operates in reflection geometry, and comprises
at least one broadband-emitting IR source, and also
at least one IR multichannel detector comprising at least two measurement channels, each of the measurement channels being equipped with an IR filter which is mounted upstream of the measurement channel in question, and each of which is transmissive only for a particular wavelength range of the IR radiation with the proviso that at least two different IR filters are used,
and in which the IR source emits IR radiation toward the coated strip surface, the radiation is partly reflected from the strip surface, and the intensity of the reflected radiation is measured with the IR multichannel detector, and from the intensity measurement, by means of an arithmetic unit, the coat thickness of the finish coat is calculated.

* * * * *